United States Patent
Sikes (10) Patent No.: US 6,808,366 B2
(45) Date of Patent: Oct. 26, 2004

(54) FLUID FLOW POWERED DYNAMO WITH LOBED ROTORS

(75) Inventor: George W. Sikes, Crystal River, FL (US)

(73) Assignee: Vertical Wind Turbine Technologies, LLC, Hilo, HI (US)

( * ) Notice: Subject to any disclaimer, the term of this patent is extended or adjusted under 35 U.S.C. 154(b) by 44 days.

(21) Appl. No.: 10/241,129

(22) Filed: Sep. 11, 2002

(65) Prior Publication Data

US 2004/0047732 A1 Mar. 11, 2004

(51) Int. Cl.[7] .................................................. F03D 3/02
(52) U.S. Cl. ........................... 416/1; 416/128; 416/144; 416/DIG. 9; 415/60
(58) Field of Search ........................... 416/1, 124, 128, 416/144, 198 R, 200 R, DIG. 9; 415/4.2, 90, 905, 906, 60

(56) References Cited

U.S. PATENT DOCUMENTS

| | | | | |
|---|---|---|---|---|
| 237,078 A | * | 1/1881 | de la Torre | 416/197 A |
| 2,007,963 A | * | 7/1935 | Cleveland | 416/197 A |
| 4,362,470 A | * | 12/1982 | Locastro et al. | 416/197 A |
| 4,784,568 A | * | 11/1988 | Benesh | 416/197 A |
| 6,172,429 B1 | * | 1/2001 | Russell | 290/55 |

FOREIGN PATENT DOCUMENTS

JP        56038575 A  *  4/1981  .............. F03D/3/06

* cited by examiner

Primary Examiner—Edward K. Look
Assistant Examiner—Richard A. Edgar (57) ABSTRACT

Multiple, timed three-lobed rotor that are more efficient yet uncomplicated and easy to produce. A rotor lobe with additional reaction surfaces near the tip to increase the angle of rotation that produces power. A "flow through" rotor having end plates that facilitate mounting more than one rotor on a common axis with rotationally varied timing and sequence, such that power delivery is smooth. A flow shielding and directing device that increases the efficiency of reaction surface rotors. Possibilities include replacement or augmentation of: existing electrical energy prime mover dynamos, air compressing, pumping, milling, and other power needs. The dynamo can be built using low-tech, low-cost materials and methods, and is inherently resistant to over speed and damage from periodically high velocity fluid flow.

8 Claims, 5 Drawing Sheets

FLUID FLOW POWERED DYNAMO WITH LOBED ROTORS

BACKGROUND

Field of the Invention

The present invention relates to improvements to the utility, efficiency, ecology, safety, and cost of prime mover dynamos that extract useful renewable power from a stream of water or wind. More specifically, this invention improves on the class of dynamos that do not rely on complex adjustment mechanisms or precise airfoil sections.

BACKGROUND

Prior Art Relating to the Invention

There are several types of wind and water dynamos known to those versed in the art:

Many vertical and horizontal wind and water dynamos use airfoil shaped blades and or stators that are difficult and expensive to manufacture, and maintain. They are subject to over speed, and sudden destructive failure modes that make them dangerous. A blade failure can send a heavy blade flying to the ground, and may even bring the whole tower down. Many also require complex gear boxes, and blade pitch control. The horizontal axis wind dynamo types must be built on tall towers, and the driven device is difficult to service, and bird kill is a problem. Many horizontal axis wind dynamos that use propeller type rotors have no way to stop the rotor for repair in high wind without risking rotor destruction.

One dynamo type is well known as the "Savonius rotor", as taught by U.S. Pat. No. 1,697,574 issued to Savonius, Jan. 1, 1929. The Savonius rotor type uses a pair of concave vertical sheets placed parallel to a vertical axis such that they rotate and produce usable power, in response to a fluid moving perpendicular to the axis of rotation. The Savonius rotor type dynamos are not as efficient as dynamos that use airfoil shapes to extract energy from a fluid stream, but they are much easer to build, and do not require expensive tooling or complex molds, or complex mechanisms of operation.

In Operation the Savonius Type Dynamos Have Several Problems

- Low starting torque.
- Inability to self start at times depending on wind direction; if the wind direction is aligned with the rotors zero torque angle, the rotor may not self start.
- Rotational speed and torque fluctuations; there is a torque pulse each revolution, as each blade rotates through the moving fluid and extracts energy from it.
- Over speed in high wind can cause structural or electrical damage.
- Insufficient rotational velocity for direct drive electricity generation in low and moderate wind.
- Poor efficiency; only about 30% of the energy is captured, partly due to the fact that the moving fluid strikes the back side of the advancing blade.
- Noisy operation due to the pressure pulses induced by only 2 power strokes per revolution.
- Structural weakness; the two blades are roughly in the same plane so the rotor design is not as stable to forces normal to that plane.
- The blade elements are large and cannot be easily broken down to transport—especially for large machines.

Others have attempted to correct the deficiencies of the Savonius type dynamos with limited success, and often added complication:

U.S. Pat. No. 6,428,275, Aug. 6, 2002, to Jaakkola discloses the use of a twisted blade to address the torque variation problem of Savonius; but the rotors require specialized equipment to form, and fluid flow tends to follow the direction of the spiral and passes without performing as much work. The helical blade elements are large and difficult to work with. The torque pulse travels linearly down the blade elements, and may develop tensional resonance if the rotational frequency corresponds with the natural torsional frequency of the rotor. The long open shapes contribute to reduced torsion rigidity.

U.S. Pat. No. 6,345,957, Feb. 12, 2002, to Szpur discloses a variation on the shape of the rotor members, and a means for controlling airflow through the rotor to limit speed in high wind. The suggested arrangement adds expense and complication of spring loaded baffle devices to limit speed, this may compromise reliability and increase maintenance requirements. The improvement over Savonius is minimal if any.

U.S. Pat. No. 6,283,711, Sep. 4, 2001, to Borg et al. discloses a variation on the shape of the rotor, and hinging a portion of the rotor blades to change shape in response to centrifugal forces of rotation. The added complexity compromises reliability and maintenance. The hinged free ends of the blades impose high forces, and must be of heavy construction to resist damage. The balance of the machine could be catastrophically affected if one side should fail to deploy at the same rate as the other side.

Both Szpur, and Borg fail to address the problems of: noise; and torque/velocity variations of the rotor; and moving fluid striking the back side of the advancing blade.

U.S. Pat. No. 6,242,818, Jun. 5, 2001, to Smedley discloses a dynamo with a multiplicity of hinged surfaces that respond to variations in wind pressure and centrifugal force to limit speed in high wind. This has the disadvantages of Borg, and has many more moving parts and consequently more opportunity for wear and failure. The stress on the parts is also much higher, as all force exerted on the movable elements must be transferred through the hinge pins.

U.S. Pat. No. 5,494,407, Feb. 27, 1996, to Benesh; discloses a modification of the blade shape to enhance energy capture efficiency. The design fails to address the other flaws of the Savonius type dynano.

U.S. Pat. No. 5,391,926, Feb. 21, 1995, to Staley et al discloses a three lobed rotor with fixed stators to direct fluid through the dynamo. The invention fails to address the rotational speed and torque fluctuations of the rotor. The projected area of the stators is much greater than the projected area of the rotor, resulting in less power for a given foot print. The turbine is designed to work best in high winds, but there are few populated areas with consistently high wind velocity.

U.S. Pat. No. 4,784,568 Nov. 15, 1988, to Benesh discloses a Savonius type dynamo with a deflector to assist starting, and to increase torque. The deflector substantially increases the footprint of the dynamo, since it needs radial clearance to move to remain in alignment with the fluid flow.

U.S. Pat. No. 4,293,274 Oct. 6, 1981, to Gilman discloses a helically twisted blade element to overcome torque variations. Like Jaakkola, the blade elements are bulky and difficult to manufacture. Gilman's device is also very complex, with many moving parts to regulate speed.

Rotary electrical generation devices are a highly developed field. Many types are well known to those versed in the art. Generally speaking, electrical generating equipment is lower cost, and takes fewer materials to produce a given amount of power if the generating elements can operate at high relative velocity. This high velocity is normally obtained by large diameter, or high rotational rate.

Rotational anti friction bearings that use magnetic force for radial and axial constraint are known to those versed in the art.

I, the inventor of the present invention, George Sikes received a U.S. design Pat. No. 300,932 Dated May 2, 1989, for a windmill design that when built, tested, and optimized eventually developed into to the present invention, the subject of this disclosure.

OBJECTS AND ADVANTAGES

The present invention seeks to exploit many advantages of the listed prior art dynamo technologies that extract power from a moving fluid, while reducing the disadvantages. The dynamo of this invention can be applied to both horizontal and vertical axis applications as will be apparent to those versed in the arts, and according to the following descriptions. The objects are:

Simplified construction using low cost, light weight materials, and smaller built up parts that may be mass produced, with low waste.

Increased starting torque and efficiency

Smooth power delivery without torque variation.

Means to adjust the torsion timing sequence of power pulses.

Simple mechanisms with low maintenance requirements.

Rigid structure to withstand storm conditions.

Optional compact deflector that takes little extra space, and increases energy capture by extracting fluid from the advancing side of the rotor.

Small foot print, with safe operation in populated areas.

Simple rotor speed control, and stopping means with optional deflector.

Means for either direct drive counter-rotation electrical generation equipment, or speed step-up (or step-down) drive for PTO.

Means to maintain rotor balance for vibration free operation.

Less noise due to flow interruptions.

Low cost, low tech production methods.

Many more advantages will be apparent upon inspection of the detailed description of preferred embodiments by those who know the various arts employed.

| Reference numerals: | |
|---|---|
| 10 | three lobed rotor |
| 15 | main reaction surface |
| 20 | end plate |
| 30 | axis of rotation |
| 32 | axle |
| 34 | anti friction bearing |
| 40 | rotor tip |
| 45 | secondary reaction surface |
| 50 | weight cavity |
| 55 | blended reaction surface |
| 60 | flow deflector |
| 62 | deflector actuator |
| 64 | flow direction sensor |
| 66 | directional vane |
| 70 | deflector vane |
| 75 | vane slot |
| 80 | energy conversion device |
| 85 | generator coils and or magnets |
| 90 | PTO |
| 93 | PTO enclosure |
| 95 | support structure |

SUMMARY OF THE INVENTION

The Sikes dynamo has many different possible preferred embodiments, depending on the desired use, as will be apparent to those versed in the art. The main elements that are disclosed are: A novel three lobed rotor design; a novel tip design that enhances efficiency and operation; and one or more multi lobed rotors on a common axis of rotation, that are rotationally timed to provide smooth. vibration free power delivery; and an optional compact deflector design that enhances efficiency and operation.

DETAILED DESCRIPTION OF THE PREFERRED EMBODIMENTS AND THEIR OPERATION

One or more rotor elements 10 with 3 main reaction surfaces 15, all on a common axis 32, such that the angular spacing of each rotor element 10 is equal to a multiple of 120 degrees divided by the number of rotor elements 10 on the common axis 30.

Each identical rotor element 10 is made with 3 main concave reaction surfaces 15 spaced at 120 degree intervals. The radius of the concave main reaction surface 15 is approximately the radius of the circle swept by the rotor 10 as it rotates on the axis 32. It is noted that non-circular curves for main reaction surface 15 concavity may also be used and still be within the scope of this invention.

Each reaction member 15 extends from the rotor tip 40 to a tangent point on an imaginary cylinder coaxial with the rotor axis 30 having a radius approximately one sixth of the rotor radius; however selection of a larger or smaller radius is anticipated for use in different conditions. The preferred range being between one-fourth and one-tenth. This rotor 10 development may also be applied to using 4 reaction surfaces 15, in this case the radial spacing is 90 degree intervals.

The relative size of reaction member 15 in the distance along the axis 30 of rotation is about half the rotor radius; the preferred range being between one-fourth and one. Greater distance being applied to timed rotor sets that use fewer rotors than four, and lesser distance to sets of more than four as will become more apparent in disclosure herein.

Adjustments to the radius and dimensions and curvilinear shape of the parts described herein may be varied up or down according to desired properties of the finished dynamo as will be apparent to those skilled in the various arts and still fall within the scope of this invention.

The secondary reaction surfaces 45 of each rotor lobe are situated at an angle that is approximately equal to the angle drawn from the rotor lobe tip 40 to a point tangent to the opposite side of the imaginary development cylinder used to lay out the angle of the main reaction surface 15. The radial dimension of the secondary reaction surface 45 is about $\frac{1}{2}^{th}$ of the radius of the rotor 10, with a useful range being from 4% to 25% of the rotor radius. This secondary surface 45 may also be curved, and fall within the scope of the invention if it provides a favorable angle to enhance starting torque when impacted by fluid flow. A somewhat larger dimension increases starting torque at the expense of rotational speed in a given wind; a smaller dimension reduces starting torque.

The purpose of the secondary reaction surface 45 is to provide an early favorable angle for the moving fluid to strike.

Blending the primary 15 and secondary 45 reaction surface creates an additional reaction surface 55 as will be set at a favorable angle for fluid moving through the hub area to react against before it exits the rotor, thereby exerting still more torque on the rotor 10.

Blending the two surfaces also serves to create a void area 50 in the tip 40 where weight may be placed for purpose of balancing the rotational moment of each rotor 10 about the axis 30; and to increase the rotational momentum to smooth out variations in rotational speed caused by any intermittent fluid stream velocity changes. The juncture of the secondary surface 45, and the blended surface 55 is shown with a radius, but in some go instances it is desired that this edge be sharp to encourage boundary layer separation according to particular design conditions relating to differing uses.

Figure 5:
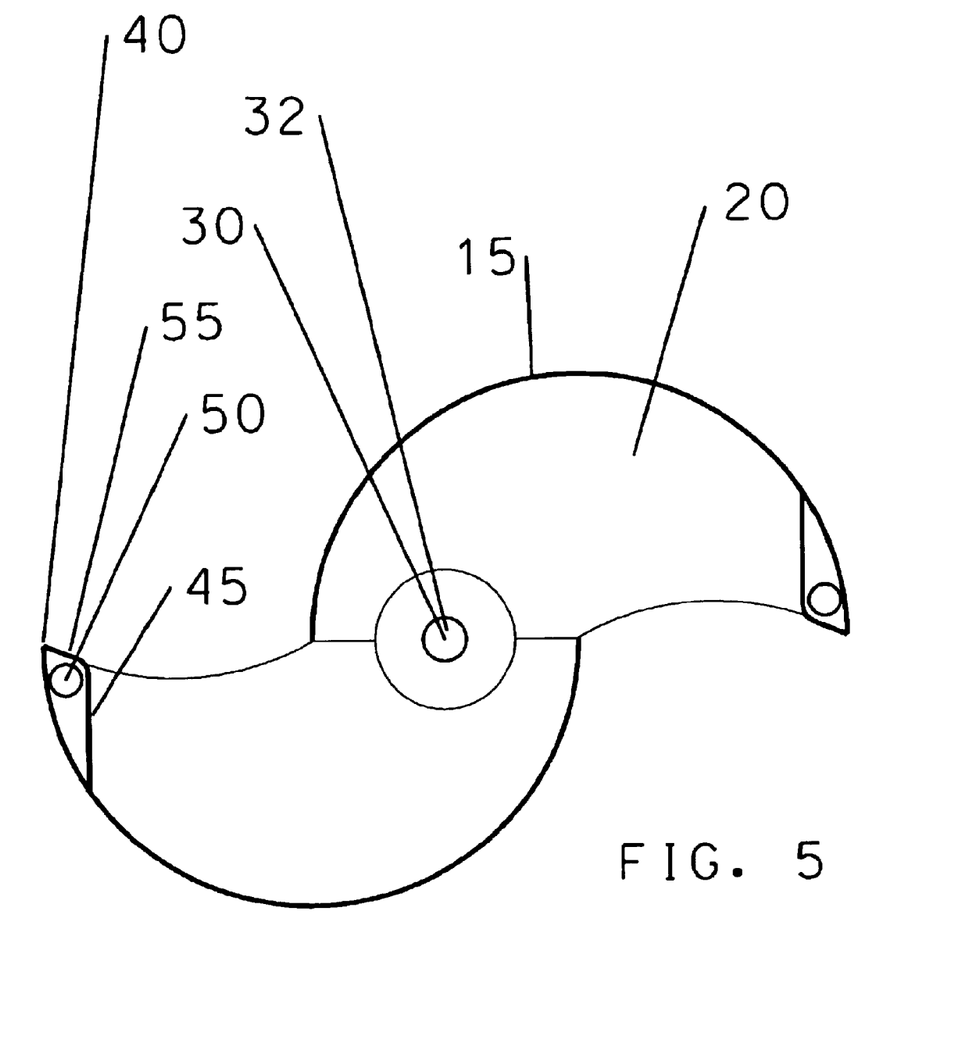
FIG. 5 shows an end sectional view of a Savonius type rotor with novel tip and endplate design.

In operation, the fluid initially strikes the surface 45, the rotor reacts and rotates into the flow; then the main reaction surface 15 is struck providing more rotation. The flow then passes through a hollow hub area and impacts the main surface 15 of the preceding lobe providing yet more rotation, and then finally the flow impacts the final reaction surface 55 providing more rotation. The effect is that the tip design greatly increases the sector of rotation that produces torque. This novel tip may also be applied to typical Savonius rotors as shown in FIG. 5.

Each of the three lobes of the rotor 10 has end plates 20 that serve to form structure to connect the individual lobes into rotors 10, and the rotors 10 into rotor sets. The end plates 20 define the reaction surface 15,45,55 shape and provide rigidity and strength to transfer the reaction loads to useful torque and rotational velocity. It is anticipated that the end plates 20 could extend beyond the bounds defined by the reaction surface, and may be any shape up to a full disk. The rotors are fastened into rotor sets by any known means such as but not limited to fasteners, welding, bonding, or interlocking. The rotor sets are fastened to support structure 95 through antifriction bearings 34 located on the axis 30 of rotation. An axle 32 may be used to support the rotor sets in the supports as known to those in the arts. If an axle 32 extends into flow areas, it should be of small diameter to avoid blocking flow.

The support 95 may be at one, or both ends of the rotor set, as dictated by use of the dynamo.

It is noted that any known means of supporting the rotor sets and other novel structures of this dynamo invention fall within the scope of this invention.

The reaction surfaces 15,45,55 and the end plates 20 maybe nested together for minimum waste and stamped out of any suitable material, or molded or formed into the reaction surfaces 15,45,55 in one or more forming or stamping or molding operations as are known to those in the arts. The material may be any suitable material, such as but not limited to; sheet metal, fiber reinforced plastic, wood, or thermal plastic.

An optional fluid flow deflector 60 may be used to increase the effectiveness of a dynamo that is operated fully immersed in a fluid stream. The deflector 60 is radial oriented along an approximately 90 degree sector of the rotor set to shield the back side of the advancing rotor lobes from the full velocity and force of the fluid flow. Deflector vanes 70, and slots 75 between the vanes 70 act as louvers in the deflector allow fluid that is expelled from the lobe tips 40 to be extracted into the fluid flow that is diverted by the deflector 60, and thereby reduce drag, and increase power of the dynamo.

Figures 3A, 3C, 3D, 3E:
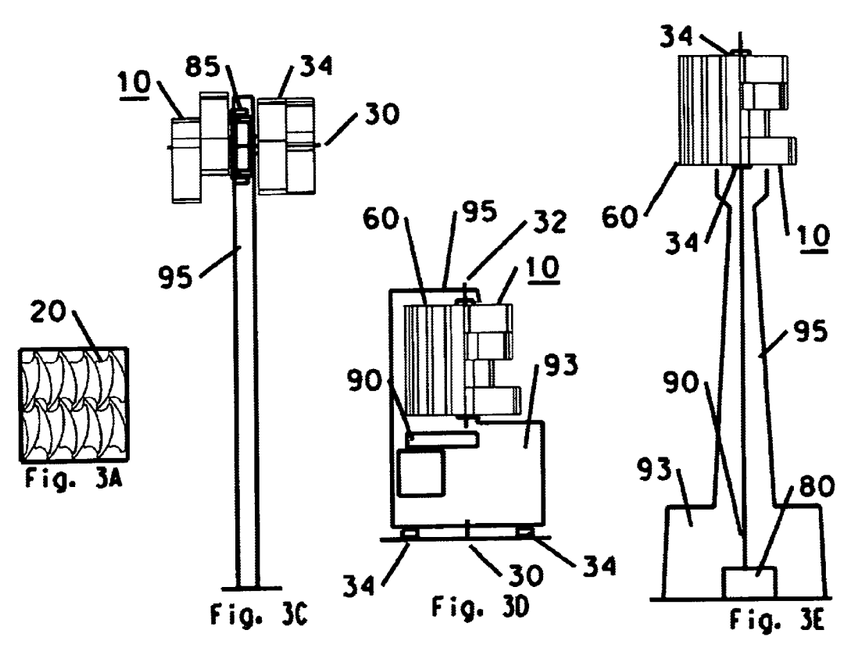
FIG. 3 shows various schematic variations: A- shows nested side plates; B- shows a horizontal axis undershot water application; C-shows a horizontal axis counter rotating pair of 2 rotors without deflectors; D- shows a vertical axis wind dynamo where a deflector is mounted to support structure that may be rotated to align with the wind; E- shows a vertical axis dynamo with a tower mount, and a ground mounted power conversion equipment; F- shows a electric vehicle with a horizontal dynamo in the front.
Figure 3B:
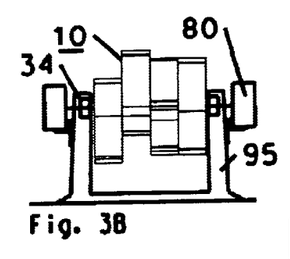
Figure 3F:
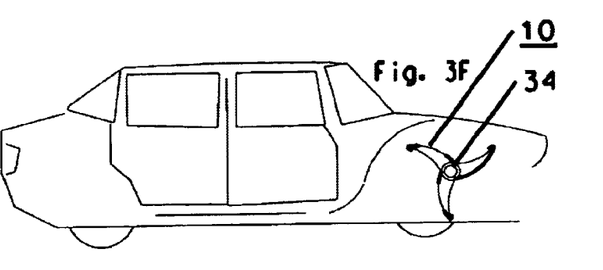
Figure 4A:
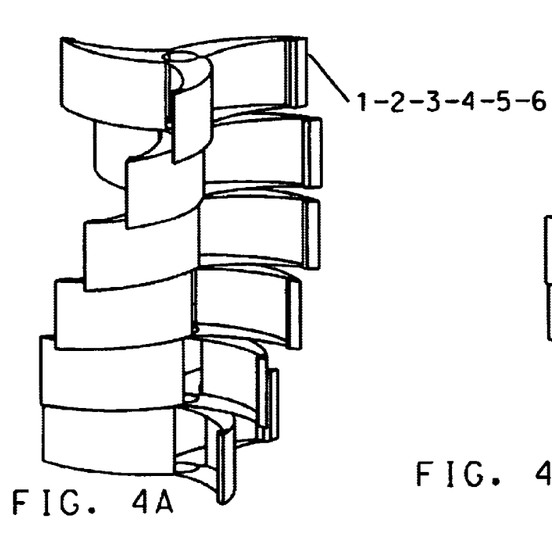
FIG. 4 shows several different timing sequences ("1" is the top rotor) in perspective: A is a six rotor set with the timing sequence 1-2-3-4-5-6; B- is six rotors timed 1-6-2-5-34; C- is 3 rotors timed 1-2-3; D- is 3 rotors timed 1-3-2.
Figure 4B:
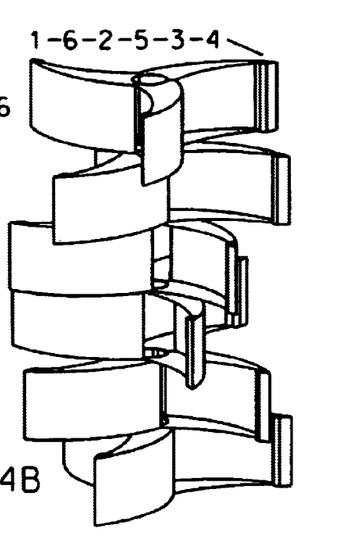
Figure 4C:
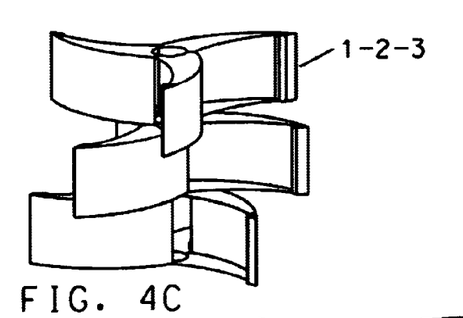
Figure 4D:
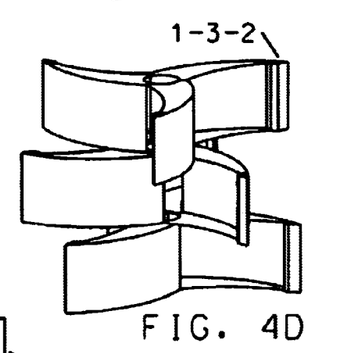
Figure 4E:
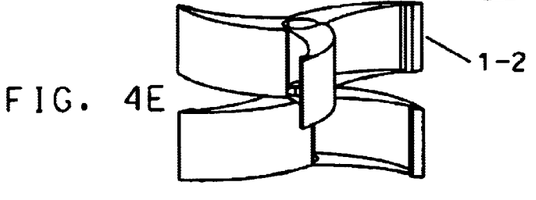

The deflector 60 may be pivotally mounted to the axis 30 of rotation, or fixedly mounted to a pivotally mounted support structure 95 as shown in FIG. 3-D.

The deflector 60 may be permanently oriented according to align with a constant flow direction, or be aligned by adjustment or actuator 62, or fluid flow to reorient and adjust to variable flow direction and force. The deflector 60 will decrease the speed of the rotor set if it is oriented to block flow into the reaction surfaces 15,45,55 of the rotors 10. The deflector 60 may also be used to bring the rotor set to a stop.

In operation, the optimal orientation of the deflector 60 varies from a position where the first vane 70 the fluid flow is exposed to is directly in line with the axis 32 of rotation, and the direction of fluid flow; to a position that exposes a few degrees more of the back side of the advancing rotor lobes.

The rotor sets with or without deflectors 60 may be supported with anti friction bearings 34 from one or both ends, or at any location between individual rotors 10, as will be apparent to those versed in the arts. Magnetic suspension systems are more costly than rolling elements but the life potential is much higher. Any other known means or method of mounting or supporting the disclosed dynamo shall not be interpreted to limit the scope of this invention.

There are many ways the dynamo of this invention may be oriented and used in a fluid stream to produce usable work within the scope of the disclosure. The descriptions herein are not to be construed to limit the use, normally apparent variations of dimensions, or materials used. There are many possibilities not specifically listed that fall within the scope of this invention as will be apparent to those skilled in the associated arts.

The embodiments can be varied to compete with many existing modes of wind or water power dynamos. The dynamo of this invention may be oriented on a horizontal or vertical axis, perpendicular to a fluid flow, as desired according to different application as will be apparent in the following examples.

In operation the dynamo is located such that wind or water current strikes the deflectors 60 and rotor sets such that they rotate on the axis and produce usable energy. The deflector60 prevents the fluid flow from directly impacting the back side of reaction surfaces15.

For wind power applications, a preferred embodiment (FIG. 1) uses two sets of four rotors10, situated on a common vertical axis30 such that ones rotates in a direction opposite to the other set. The counter-rotating sets of rotors 10 are each attached to generator magnets or coils85 such that the relative velocity is twice as fast at a given radius, than would be the case if the two sets were each attached to independent generators without benefit of the counter rotation. The air gap between generator elements85 may be either radial or axial, and the magnetic interaction may be used to help lift the rotor to reduce the load on bearings34.

Figure 1:
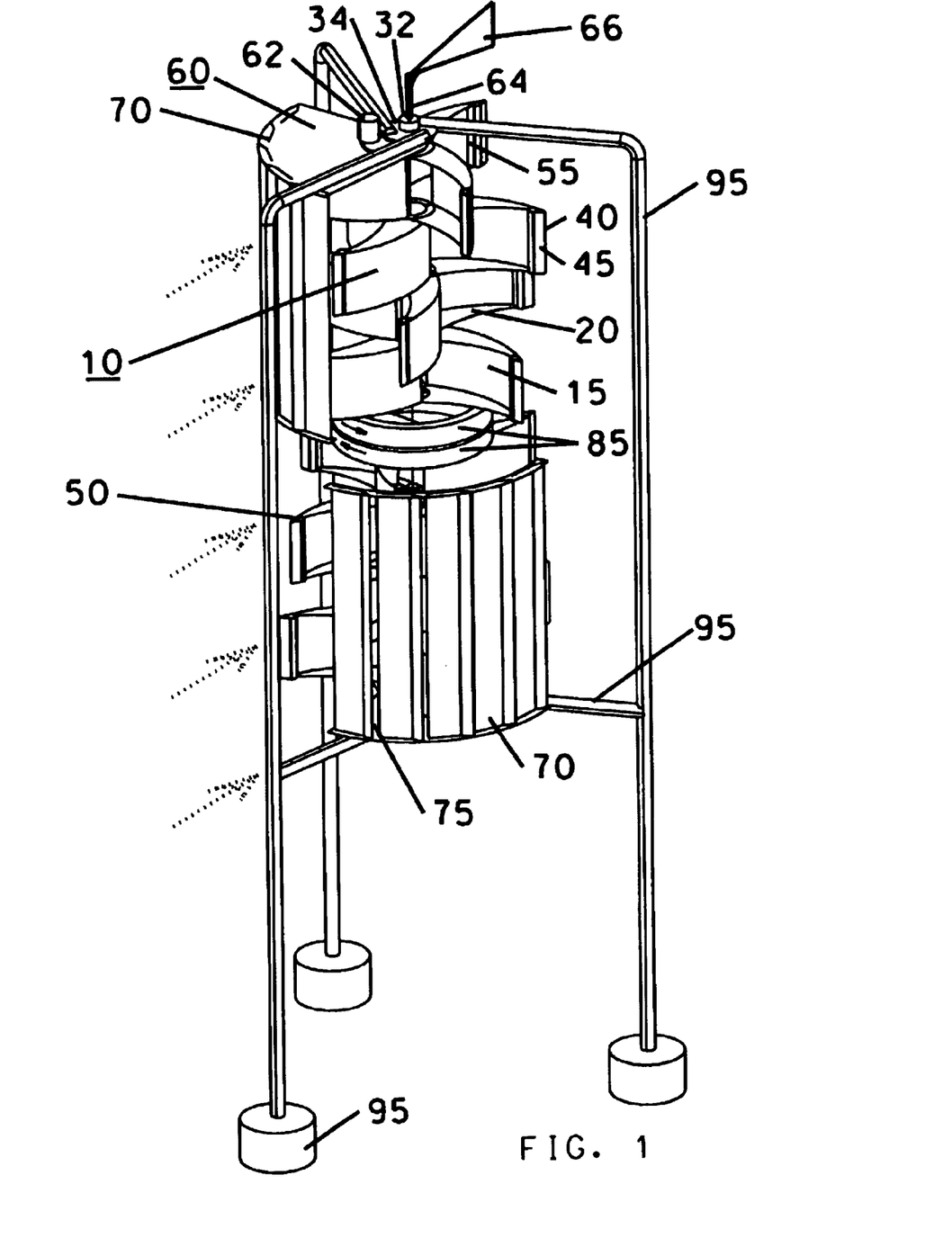
FIG. 1 shows a vertical wind dynamo configuration, employing counter-rotation of two sets of four rotors, and wind deflectors; the timing sequence is 1-4-3-2.
Figure 2:
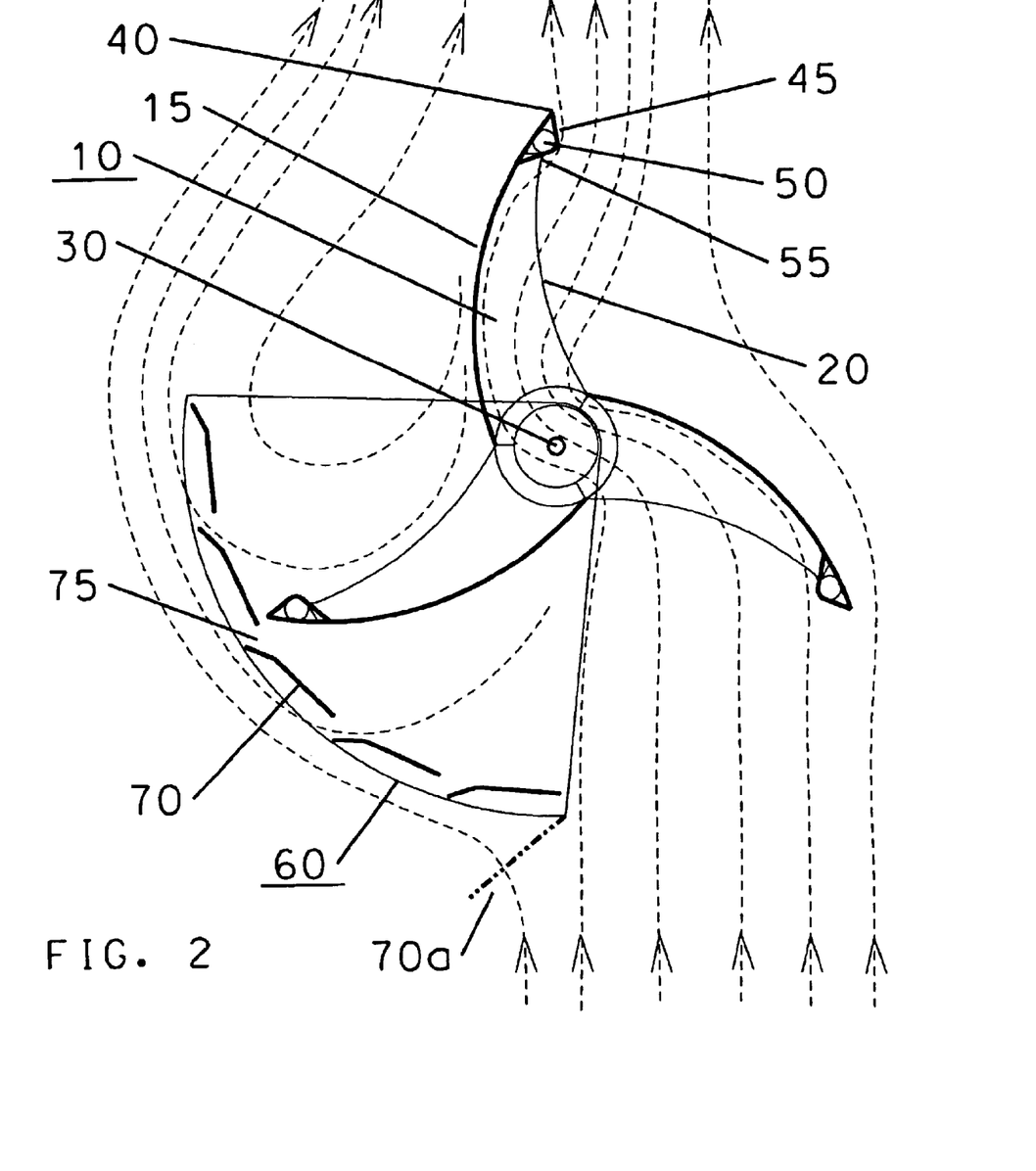
FIG. 2 shows a plan view of a single 3 lobed rotor element, with a deflector, and flow lines.

The deflectors60 are aligned to the wind by sensing the wind direction using wind direction sensors64, and wind force and rotation speed sensors, and energizing an actuator62 to bring the deflector60 into alignment, such that power production is optimized according to typical needs, and the dynamo is protected from damage. Any known actuator62 types may be used, such as but not limited to, electric servo, electric motor, fluid flow reaction surface, or manual manipulation.

The first one or more deflector vanes70 may be set such that flow that would normally be directed around the rotor set, is directed through the rotor set to increase power.

For smooth power delivery it is desired to provide more power pulses for each rotation. The general equation for the rotational separation of the rotors in degrees is found by dividing 360 degrees by the number of lobes on each rotor10; and taking the result and further dividing it by the number of rotors to be used in the set.

A two lobed "Savonius type" rotor having 5 rotors would have a rotational separation of 360 deg/2/5=36 degrees; therefore it would have 10 power pulses per revolution opposed to only 2 with the prior art. It is intended that this novel method for producing any desired degree of power delivery smoothness may be applied to any rotor design of any fluid power dynamo.

The torsion vibration characteristics of the dynamo may be adjusted by selecting different timing sequences to apply the torque pulses from the rotors10.

For instance a set of four, 3-lobed rotors10, may be timed to provide pulses with the peaks at 30 degree intervals as rotation occurs; and timed with one of six different pulse sequences as follows: 1-2-3-4; 1-2-4-3; 1-3-4-2; 1-3-2-4; 1-1-4-2-3, and 1-4-3-2. Each different sequence will excite different torsion vibration modes as will be apparent to those versed in the arts.

A set with 3, 3-lobed rotors10, set at 40 degree intervals can be timed with two different sequences of 1-2-3, or 1-3-2. The use of 5 or more rotors10 in a set greatly increases the opportunity for differing the power pulse timing sequence for vibration free operation. The invention affords the opportunity to tune out destructive resonance that may occur if only one sequence of pulse timing were available.

Besides electrical generators many other energy conversion devices80 may be driven by the Sikes dynamo; for instance pumps, air compressors, PTO90 for saws, mills, etc. For use as a prime mover, a PTO enclosure93 may also serve as mounting and support structure95.

Conclusion, Ramification, and Scope

A horizontal dynamo constructed according to the teachings of this disclosure may be situated in the front grill of an automobile to recharge batteries, or compressed air energy storage if faced into prevailing wind.

A vertical axis Sikes "windcrank™" dynamo may power a boat by using the rotational energy, and wind force reaction to drive the vessel.

A horizontal axis Sikes dynamo may be placed in a stream of water such that the axis30 is at the surface of the water, and the use of a deflector60 is not needed.

A prototype build according to the teachings of this disclosure tested satisfactorily with and without a deflector in up to 80 mph winds with no damage apparent. The prototype exhibited unusually quiet and smooth operation; it would self start in all wind conditions. The optional deflector60 was effective in increasing power, and capable of stopping the rotation in even high winds. The unit provides usable power without a deflector, but at reduced output. The extra relation surfaces45,55 at the tip40 provide increased torque, and power. Also starting was greatly enhanced, and the speed self limited in high winds. Another noted advantage is that no bird kill was noted. The disclosed dynamo is particularly suited for use in developing countries where sophisticated methods of production are not available, and the work force is usually only equipped with basic skills. This description of some possible embodiments should not be interpreted to limit the use in many other fields as will be obvious to those versed in the art. There are many possible variations of the aspects of the dynamo taught herein that fall within the scope of this invention as will be apparent to those versed in the arts.

I claim:

1. A method of producing power from a free stream fluid flow comprising the steps:

a) providing a means to redirect a fluid flow,
   b) providing a main means for reactive energy capture,
   c) providing a means for rotational energy conversion,
   d) providing a support means,
   e) providing means for antifriction rotation,
   f) providing a flow direction sensing means,
   g) providing a rotational position adjusting means,
   h) adjusting the rotational timing of a plurality of said main means for reactive energy capture such that rotational power delivery is consistent and without fluctuation,
   i) mounting the rotationally timed plurality of said main means for reactive energy capture onto said support means using said means for antifriction rotation such that rotation may occur with minimal friction,
   j) coupling said rotational position adjusting means to said means to redirect a fluid flow such that said means to redirect a fluid flow directs fluid flow to maximize rotational energy capture of each main means for reactive energy capture according to flow direction information provided by said flow direction sensing means,
   k) providing secondary reactive means to increase the reactive effort the fluid flow exerts on said main reactive energy capture means, as the fluid initially contacts the said reactive energy capture means,
   l) providing a means of placing weight in the void area formed between the secondary and main reactive means; whereby vibration and rotational speed variations are minimized.
   m) attaching said means for rotational energy conversion to the plurality of timed reactive energy capture means such that useful work may be accomplished.

2. The method of claim 1 comprising the further step of providing a blended reactive means to increase the reactive effort the fluid flow exerts on said main reactive energy capture means, as the fluid flow leaves the blended reactive energy capture means.

3. A prime mover dynamo comprising:
   a) A rotor set comprising more than one substantially identical rotors on a common axis; said rotors having two, or three, or four lobes; and said rotors oriented such that they are rotationally separated by an angular degree measure equal to 360 degrees divided by the number of lobes per rotor, and further divided by the number of rotors in the set;
   b) a rotor set support structure with anti-friction means that interposes said rotors with the axis of rotation substantially normal to a fluid stream; and
   c) lobe tips with a secondary reaction means whereby the angle of rotation that produces power is increased, and optional weight may be placed for balance, and rotational energy storage; and
   d) an energy conversion device selected from the group comprising: electrical current generators, air or vapor compressors, PTO unit, pumps, mechanical drives, saws, and mills; whereby rotational energy from the rotors is smoothly converted into useful work.

4. A prime mover dynamo of claim 3 where there is a second set of substantially identical rotors on a common axis but rotate the opposite direction in response to the fluid flow, and the energy conversion device is an electrical generator, such that the relative velocity of moving electromagnetic generating elements is the sum of the rotational velocities of the two rotor sets.

5. A prime mover dynamo rotor of claim 3 with a slotted flow deflector that reduces the amount of fluid striking the back side of the rotor reaction members; said deflector comprising a plurality of vanes and slots arranged in a sector of approximately 90 degrees of the circumference of a cylinder swept by the rotor.

6. A prime mover dynamo rotor of claim 3 with a slotted flow deflector that reduces the amount of fluid striking the back side of the rotor reaction members; said deflector comprising a plurality of vanes and slots arraigned in a sector of approximately 90 degrees of the circumference of a cylinder swept by the rotor; said deflector having a means to keep it aligned with flow from variable direction.

7. A prime mover dynamo rotor with an axis of rotation comprising: three or four main concave reaction surfaces, each said surface extending from a line parallel to the axis but displaced from the axis by a distance equal to the overall radius of the rotor divided by any where from 4 to 10; and each said surface ending at a tip point on the circumference of the rotor diameter that is at an approximately right angle from a line extending from the axis to the origin of the main reaction surface; and each said main reaction surface having a preferred axial measure between 0.25 and 1 times the rotor radius and secondary reaction surfaces extending from the tip point of each main reaction surface inward toward the axis of rotation such that the angle relative to the free stream fluid flow is between 4 degrees and 16 degrees when the tip point is in the rotational position that places the tip point at the upstream most location, said secondary surface extending inward a distance between 4% and 25% of the rotor radius; whereby a reaction force from the fluid stream is available to turn said rotor a few degrees of rotation earlier than the tip point enters the point perpendicular to the stream flow, said secondary reaction surface forming a retention area for balance weight and additional rotational mass.

8. The rotor of claim 7 wherein secondary reaction surfaces further comprising a blended reaction surface extending from the most inward point of the secondary reaction surface inward toward the axis at an angle sufficient to cause it to meet the main reaction surface at a point that is between 2 and 4 times the radial distance the secondary reaction surface extends inward; whereby yet additional rotation is caused as fluid flows out of the rotor, and a void retention area for balance weight and additional rotational mass is formed.

* * * * *